US009930992B2

(12) United States Patent
Florkey

(10) Patent No.: US 9,930,992 B2
(45) Date of Patent: Apr. 3, 2018

(54) COOKING APPARATUS AND SYSTEMS WITH AIR PURGE AND HEATERS

(71) Applicant: HENNY PENNY CORPORATION, Eaton, OH (US)

(72) Inventor: Edward J. Florkey, Vandalia, OH (US)

(73) Assignee: Henny Penny Corporation, Eaton, OH (US)

( * ) Notice: Subject to any disclaimer, the term of this patent is extended or adjusted under 35 U.S.C. 154(b) by 35 days.

(21) Appl. No.: 14/902,572

(22) PCT Filed: Jul. 3, 2014

(86) PCT No.: PCT/US2014/045482
§ 371 (c)(1),
(2) Date: Jan. 3, 2016

(87) PCT Pub. No.: WO2015/003168
PCT Pub. Date: Jan. 8, 2015

(65) Prior Publication Data
US 2016/0166112 A1    Jun. 16, 2016

Related U.S. Application Data

(60) Provisional application No. 61/842,933, filed on Jul. 3, 2013.

(51) Int. Cl.
*F24H 1/20* (2006.01)
*H05B 3/78* (2006.01)
(Continued)

(52) U.S. Cl.
CPC ............. *A47J 37/1285* (2013.01); *A23L 5/11* (2016.08)

(58) Field of Classification Search
None
See application file for complete search history.

(56) References Cited

U.S. PATENT DOCUMENTS 4,064,796 A    12/1977  Jones
4,420,006 A *  12/1983  Moore ................ A47J 37/1223
                                                          134/115 R
(Continued)

FOREIGN PATENT DOCUMENTS

CN    101621950 A    1/2010
CN    101879045 A    11/2010
(Continued)

OTHER PUBLICATIONS

International Searching Authrority/US, International Search Report and Written Opinion in Patent Application No. PCT/US2014/045482, dated Nov. 3, 2014.
(Continued)

*Primary Examiner* — Thor Campbell
(74) *Attorney, Agent, or Firm* — Wood Herron & Evans LLP

(57) ABSTRACT

A cooking apparatus comprises a heated compartment to warm cooking media that may be packaged in metal containers or the like. The heater system includes at least one heater disposed at a location to heat the bottom of the unused cooking medium container. The heater system may also include at least one heater disposed at a location to heat at least one side of the unused cooking medium container. A cooking apparatus comprises at least one supply reservoir, a fluid motive device, various enclosed cooking medium conductors or lines, a three-way valve that introduces air for purging the lines, and a cooking medium receiving system.

12 Claims, 11 Drawing Sheets

(51) Int. Cl.
*A47J 37/12* (2006.01)
*A23L 5/10* (2016.01)

(56) References Cited

U.S. PATENT DOCUMENTS

| | | | | |
|---|---|---|---|---|
| 4,974,501 A * | 12/1990 | Grob | ............... | A47J 37/1223 |
| | | | | 210/DIG. 8 |
| 5,160,444 A * | 11/1992 | McFarland | ............ | B01D 29/15 |
| | | | | 210/120 |
| 5,617,777 A * | 4/1997 | Davis | ............... | A47J 37/1223 |
| | | | | 210/167.28 |
| 5,839,360 A * | 11/1998 | Williams | ............ | A47J 37/1223 |
| | | | | 210/167.28 |
| 5,973,297 A | 10/1999 | Winter et al. | | |
| 6,235,210 B1 * | 5/2001 | Saksena | ............ | A47J 37/1223 |
| | | | | 210/167.28 |
| 6,572,764 B2 * | 6/2003 | Mullaney, Jr. | ...... | A47J 37/1223 |
| | | | | 210/167.28 |
| 6,745,669 B2 * | 6/2004 | Suzuki | ............... | A47J 37/1266 |
| | | | | 126/374.1 |
| 7,885,521 B2 * | 2/2011 | Feinberg | ............ | A47J 37/1223 |
| | | | | 392/441 |
| 7,938,959 B1 | 5/2011 | Inman et al. | | |
| 8,111,979 B2 | 2/2012 | Feinberg et al. | | |
| 8,505,443 B2 | 8/2013 | Abney et al. | | |
| 8,567,306 B2 | 10/2013 | Kimura et al. | | |
| 2002/0038604 A1 * | 4/2002 | Chikazawa | ......... | A47J 37/1285 |
| | | | | 99/330 |
| 2003/0196940 A1 * | 10/2003 | Mullaney, Jr. | ...... | A47J 37/1223 |
| | | | | 210/167.28 |
| 2004/0007137 A1 * | 1/2004 | Hwang | ............... | A47J 37/1223 |
| | | | | 99/330 |
| 2004/0035299 A1 * | 2/2004 | Suzuki | ............... | A47J 37/1266 |
| | | | | 99/330 |
| 2008/0196596 A1 * | 8/2008 | Forrest | ............... | A47J 37/1219 |
| | | | | 99/408 |
| 2008/0213446 A1 | 9/2008 | Feinberg et al. | | |
| 2008/0282905 A1 * | 11/2008 | Savage | ............... | A47J 37/1223 |
| | | | | 99/408 |
| 2009/0084273 A1 * | 4/2009 | Lackman | ........... | A47J 37/1223 |
| | | | | 99/408 |
| 2012/0240789 A1 | 9/2012 | Hohler et al. | | |

FOREIGN PATENT DOCUMENTS

CN 101933762 A 1/2011
WO 2008105858 A1 9/2008

OTHER PUBLICATIONS

European Patent Office, Extending European Search Report in related EP Application No. 14820674.1 dated May 3, 2017 (11 pages).

Chinese State Intellectual Property Office, First Office Action in related CN Application No. 2014800481762 dated Mar. 31, 2017 and English language translation (18 pages).

* cited by examiner

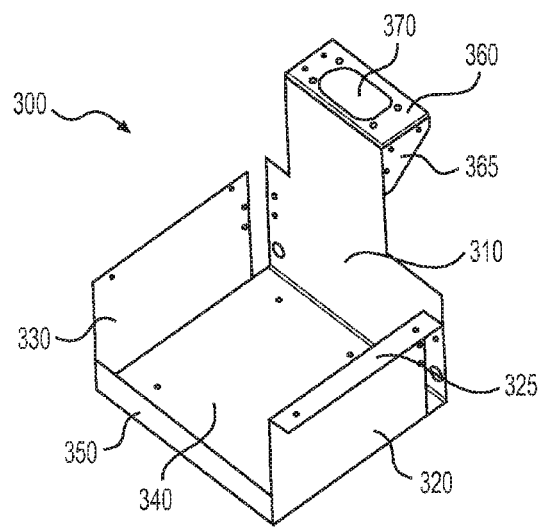
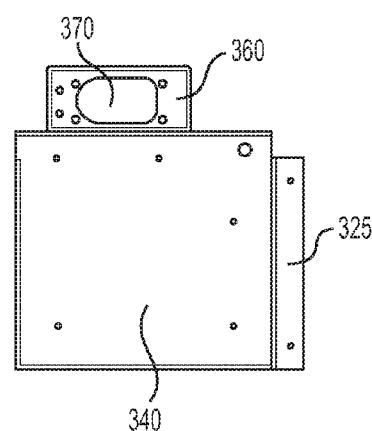
FIG. 3A
FIG. 3B
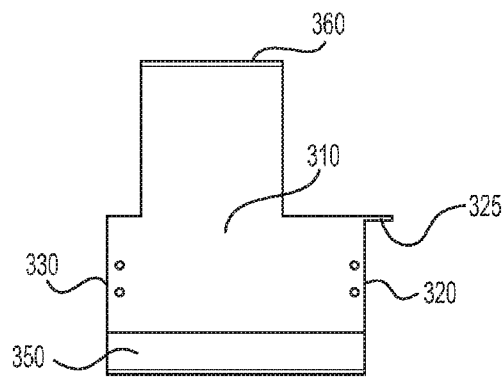
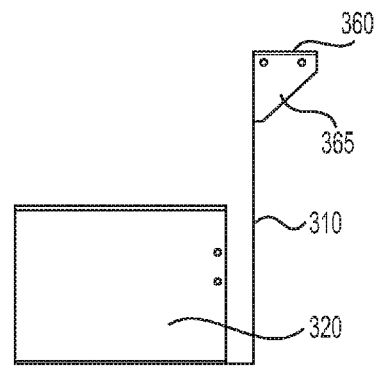
FIG. 3C
FIG. 3D

COOKING APPARATUS AND SYSTEMS WITH AIR PURGE AND HEATERS

CROSS-REFERENCE TO RELATED APPLICATIONS

This application is a U.S. National Stage Patent Application under 37 U.S. C. § 371 of International Patent Application No. PCT/US2014/045482, filed on Jul. 3, 2014, which claims priority from U.S. Provisional Patent Application No. 61/842,933, filed on Jul. 3, 2013, each of which is incorporated herein by reference.

BACKGROUND OF THE INVENTION

1. Field of the Invention

The invention relates generally to cooking apparatus and systems having heaters and capable of air purge.

2. Description of Related Art

When preparing food in fryer apparatus that use cooking media, including, for example, an open fryer and a pressure fryer, the quality of the cooking medium (e.g., an oil, a liquid shortening, a meltable-solid shortening, and a semi-solid shortening) may impact the quality of the food products (e.g., poultry, fish, and potato products) that are cooked. Known fryer apparatus may include one or more cooking chambers, e.g., fryer pots or vats, which may be filled with a cooking medium.

As the cooking medium is used to cook food, particles of food may contaminate the cooking medium. The flavor characteristics of each of these food particles may become infused in the cooking medium. This infusion may affect food quality adversely. Moreover, upon heating the cooking medium, the cooking medium may undergo chemical reactions e.g., hydrolysis, oxidation, or polymerization, or combinations thereof. These chemical reactions may result in compounds, such as free fatty acids, hydroperoxides, or polymerized triglycerides, or combinations thereof. In addition, such reactions may reduce the viscosity of the cooking medium, which also may adversely affect cooking performance. Thus, a filtering process is often implemented to drain the cooking medium from the cooking chamber into a filter vessel, filter the medium, and return the filtered medium to the cooking chamber. After a time, the cooking medium needs to be replaced. The cooking medium in use ranges from low viscosity liquid to essentially solid at room temperature. The new cooking medium is packaged in containers, e.g., metal or plastic containers or the like, to be used in the cooking apparatus. In addition, cooking media within lines or pipes in the cooking apparatus solidify due to local freezing or hardening.

SUMMARY OF THE INVENTION

Therefore, a need has arisen for heaters located within a cooking apparatus for warming unused cooking media so that it can be more easily distributed to one or more cooking vessels and a means to purge cooking media from cooking lines, which overcome these and other shortcomings of the related art.

In an embodiment of the invention, a cooking apparatus comprises a heated compartment to warm cooking media that may be packaged in metal or plastic containers or the like. The heater system includes at least one heater disposed at a location to heat the bottom of the unused cooking medium container. The heater system may also include at least one heater disposed at a location to heat at least one side of the unused cooking medium container.

In an embodiment of the invention, a cooking apparatus comprises at least one supply reservoir, a fluid motive device (e.g., a pump, or the like), at least one three-way valve, various enclosed cooking medium conductors or lines, and a cooking medium receiving system.

Other objects, features, and advantages of the present invention are apparent to persons of ordinary skill in the art in view of the following detailed description of embodiments of the invention and the accompanying drawings.

BRIEF DESCRIPTION OF THE DRAWINGS

For a more complete understanding of the embodiments of the present invention, needs satisfied thereby, and the objects, features, and advantages thereof, reference now is made to the following description taken in connection with the accompanying drawings.

FIG. 3A is a perspective view of a shelf for holding a cooking medium container, according to an embodiment of the invention.

FIG. 3B is a top view of a shelf for holding a cooking medium container, according to an embodiment of the invention.

FIG. 3C is a front view of a shelf for holding a cooking medium container, according to an embodiment of the invention.

FIG. 3D is side view of a shelf for holding a cooking medium container, according to an embodiment of the invention.

DETAILED DESCRIPTION OF EMBODIMENTS OF THE INVENTION

Preferred embodiments of the present invention, and their features and advantages, may be understood by referring to FIGS. 1-11B, like numerals being used for corresponding parts in the various drawings.

Figure 1:
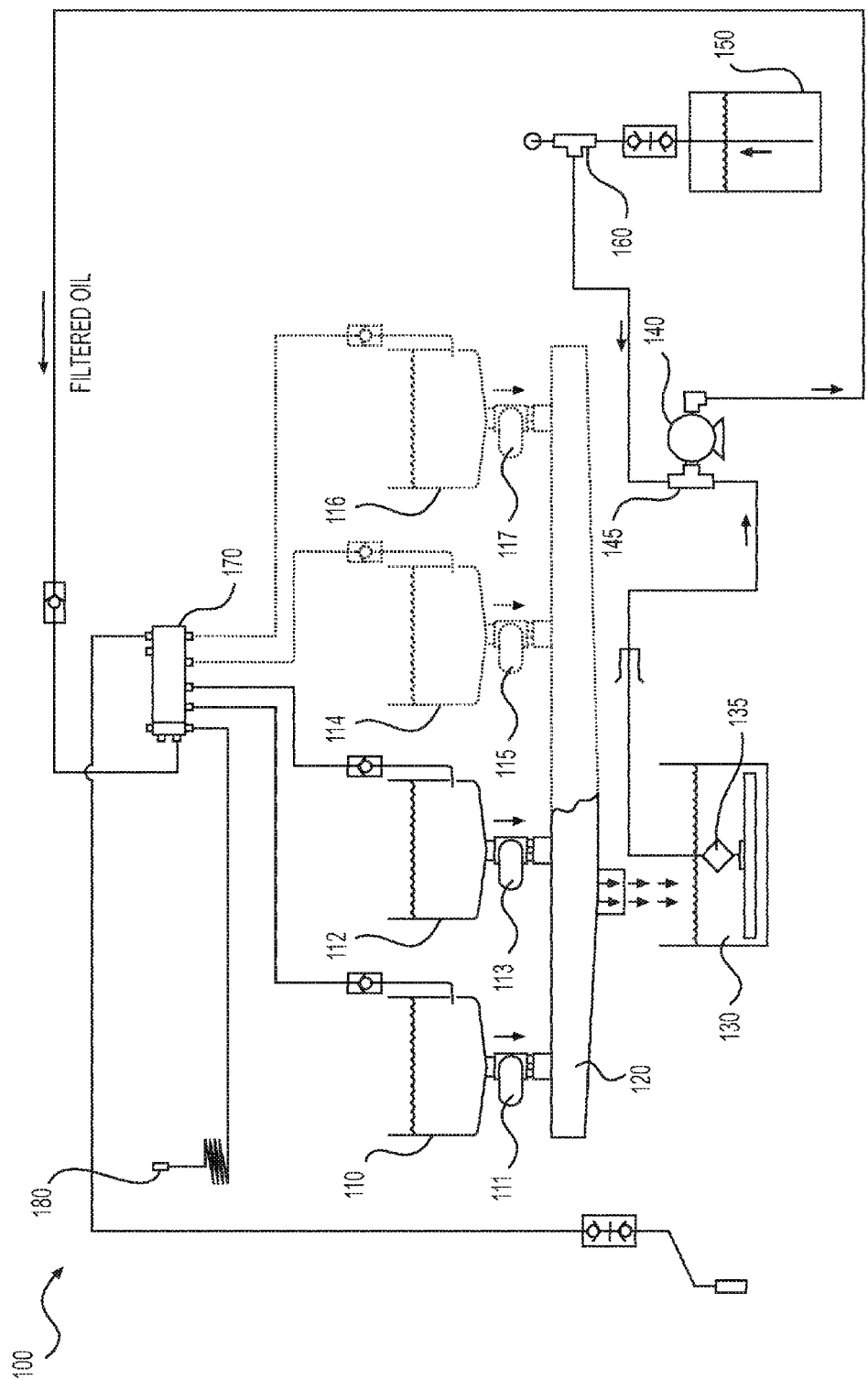
FIG. 1 is a schematic diagram depicting a cooking apparatus, according to an embodiment of the invention.

FIG. 1 depicts a schematic diagram of a cooking apparatus 100, according to an embodiment of the invention. Cooking apparatus 100 may include a cooking chamber 110 that is configured to hold cooking media therein. Cooking apparatus 100 may include a plurality of cooking chambers disposed adjacent one another, for example, 110, 112, 114, and 116, as depicted in FIG. 1. Each of cooking chambers 110-116 may have a respective drain valve, 111, 113, 115, and 117, coupled to an outlet portion of each of cooking chambers 110-116. Each of the drain valves 111-117 may selectively drain cooking media from each of the respective cooking chambers 110-116 into a drain portion 120. Drain valves 111-117 may be configured to automatically drain cooking media from respective cooking chambers 110-116 into drain portion 120. Drain portion 120 may be configured to direct cooking media toward a filter pan 130. Cooking media may exit drain portion 120 through an outlet to enter filter pan 130. Cooking media that enters filter pan 130 may be filtered through a filtering process.

The filtering described above may include a variety of filtering processes. For example, the filtering may include a frequent filtering or a maintenance filtering, or the like, or a combination thereof. A frequent filtering may be one of multiple filterings of cooking media performed periodically during a day, or other period of time, to remove particles, such as crumbs, silt, clumps, cracklings, cooking medium deterioration compounds, and the like. For example, the frequent filtering may comprise draining cooking media from the cooking chamber 110 to a filter pan 130, circulating cooking media through a filter 135, and pumping cooking media from filter pan 130 back into cooking chamber 110 via pump 140. The frequent filtration also may include, for example, skimming crumbs, silt, clumps, cracklings, cooking medium deterioration compounds, or the like, from the cooking medium.

A maintenance filtering may be performed daily, or periodically at other time intervals (e.g., intervals of greater than one day or less than one day) to clean the cooking chamber 110, filter pan 130, or other components of a cooking apparatus. For example, the maintenance filtering may include a more thorough cleaning of cooking chamber 110, which may include scraping accretion of particles from the cooking chamber walls, brushing particles from cooking chamber crevices and cavities, and soaking the cooking chamber with a cleaning solution (e.g., a detergent, a slightly high pH cleaning solution, or the like). The particles may include, for example, crumbs, silt, clumps, cracklings, cooking medium deterioration compounds, and the like.

As described above, pump 140 may pump cooking media from filter pan 130, through filter 135, and out of filter pan 130 to a filter line. A three-way valve 145 may be in fluid communication with filter pump 140 to direct cooking media from filter pan 130 to return to cooking chambers 110-116. The filtered cooking media that is returned may pass through a selector valve 170. Selector valve 170 may be configured to selectively direct cooking media to one of cooking chambers 110-116. In addition, a pressure transducer 180 may be in fluid communication with selector valve 170 and may be configured to determine a pressure of the cooking media in cooking apparatus 100. After a predetermined amount of time or a predetermined number of filtering cycles, the cooking media may need to be replaced.

Figure 2A:
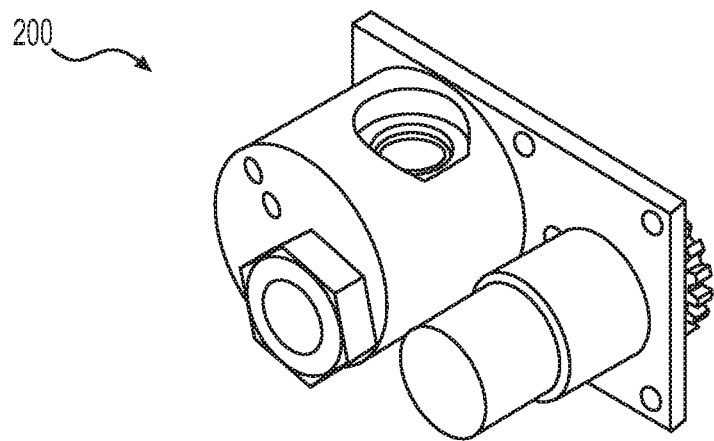
FIGS. 2A and 2B are perspective views of a three-way valve, according to an embodiment of the invention.
Figure 2B:
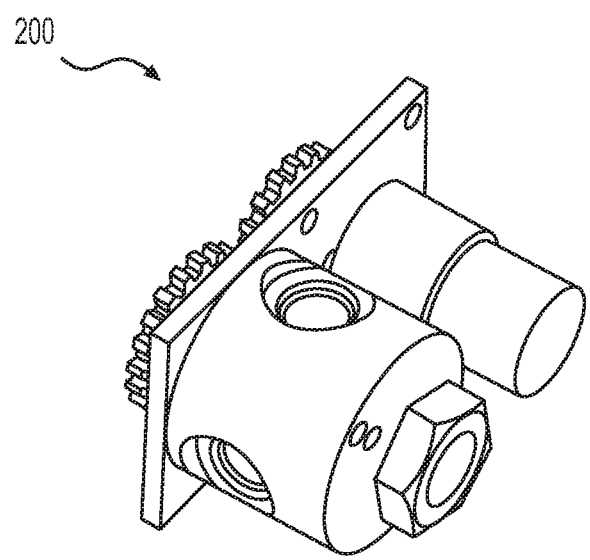

New cooking media may be stored in a cooking media vessel 150. Cooking media vessel 150 may be in fluid communication with a three way valve 160. In addition, three-way valve 160 may be configured to introduce ambient air into the system. FIGS. 2A and 2B depict perspective views of a three-way valve 200, according to an embodiment of the invention. Three-way valve 200 is an example of a three-way valve that may be used as three-way valve 145 and/or three-way valve 160. During use, cooking media may become hardened or solidified within various lines of the cooking apparatus. Thus, a purging of the lines may be desired to purge cooking media from the lines and prevent such hardening or solidification of cooking media within the lines. The three-way valve 160 may connect, via lines (e.g., pipes, tubes, or the like), the cooking media vessel 150 to the pump 140 when it is desirable to pump cooking media from the cooking medium vessel 150 and may connect an air inlet to the pump 140 when it is desirable to pump air through the lines. Accordingly, air may be selectively pumped through the lines to purge cooking media from the lines.

As depicted in FIG. 1, cooking apparatus 100 may include three-way valve 145 that may be configured to connect to an inlet of pump 140 either one of cooking chambers 110-116 that is intended to be emptied or three-way valve 160. Cooking apparatus 100 may further include three-way valve 160 that may be configured to connect to the non-cooking chamber inlet of three-way valve 145 either cooking media vessel 150 or an air inlet. Accordingly, the lines may be purged even when a reservoir is intended to remain at least partially full or not be emptied. In an embodiment, only one of cooking chambers 110-116 may be in fluid communication with pump 140 at a time.

In operation, pump 140 may be configured to pump cooking media for a predetermined amount of time. Subsequent to the predetermined amount of time, air may be introduced through three-way valve 160 and pumped for a predetermined amount of time. The level of cooking media in the connected cooking chamber may then be determined. The determined amount or level of cooking media in the cooking chamber may be compared to a threshold to determine if the amount or level of cooking media is sufficient, i.e., if the amount or level of cooking media is greater than or equal to the threshold. If the amount or level of cooking media is determined to be less than the threshold, another cycle may be initiated of pumping cooking media for a predetermined amount of time and then pumping air for a predetermined amount of time. Accordingly, a number of cycles of alternately pumping cooking media and air may be executed until the amount or level of cooking media in the connected one of the cooking chambers 110-116 is greater than or equal to a predetermined threshold. The amount or level of cooking media in the cooking chambers 110-116 may be determined in a variety of ways, including, for example, a sensor or plurality of sensors that provide a signal as feedback related to the amount or level of cooking media in the cooking chambers 110-116.

The new oil that may be pumped into cooking apparatus 110 may be stored in cooking media vessel 150. Cooking media vessel 150 may be disposed on a shelf in cooking apparatus 100. FIG. 3A depicts a perspective view of a shelf 300 for holding a cooking medium container (e.g., cooking media vessel 150), according to an embodiment of the invention. Shelf 300 may be configured to hold cooking medium vessel 150 therein, for example, in a case in which cooking medium vessel 150 may be a metal container. Some or all of the cooking media in cooking medium vessel 150 may become less viscous or partially or fully solidified. Thus, it may be beneficial to provide a heater system in shelf 300 to warm cooking media contained in cooking medium vessel 150. By warming the cooking media within cooking medium vessel 150, the cooking media may be more easily distributed to one or more cooking chambers 110-116.

Shelf 300 may include a bottom wall 340, a rear wall 310, side walls 320 and 330, a front wall 350, a side edge 325, a top edge 360, and a top-side edge 365. An opening 370 may be formed in top edge 360 and opening 370 may be configured to accommodate three-way valve 160. Side walls 320 and 330 may be substantially parallel to each other and may be substantially perpendicular to bottom wall 340, rear wall 310, and front wall 350. FIG. 3B depicts a top view of shelf 300 and FIG. 3C depicts a front view of shelf 300. As depicted in FIG. 3C, side edge 325 may be substantially perpendicular to side wall 320. As depicted in FIG. 3D, which depicts a side view of shelf 300, top edge 360 may be substantially perpendicular to rear wall 310 and to top-side edge 365. As further depicted in FIG. 3D, there may be a space provided between side walls 320 and 330 and rear wall 310.

Figure 4A:
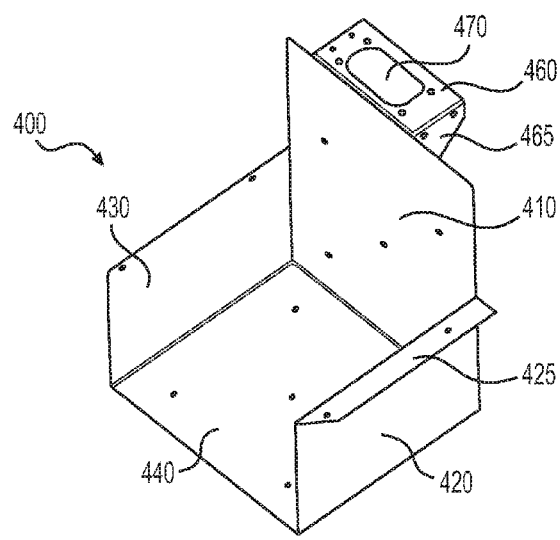
FIG. 4A is a perspective view of a shelf for holding a cooking medium container, according to another embodiment of the invention.
Figure 4B:
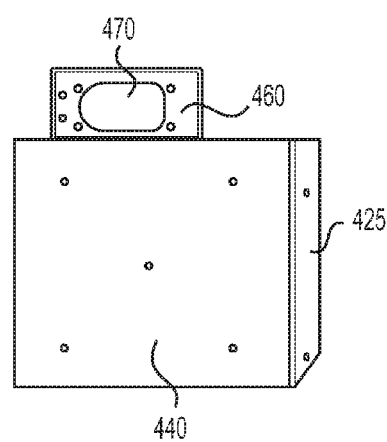
FIG. 4B is a top view of a shelf for holding a cooking medium container, according to another embodiment of the invention.
Figure 4C:
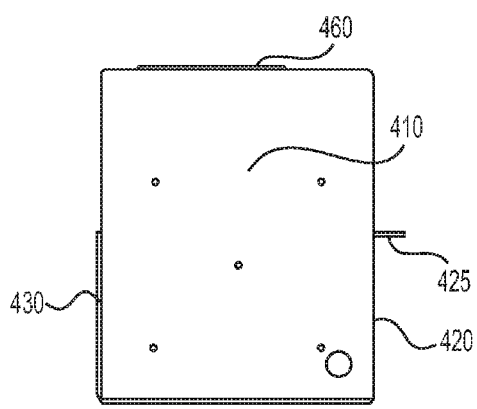
FIG. 4C is a front view of a shelf for holding a cooking medium container, according to another embodiment of the invention.
Figure 4D:
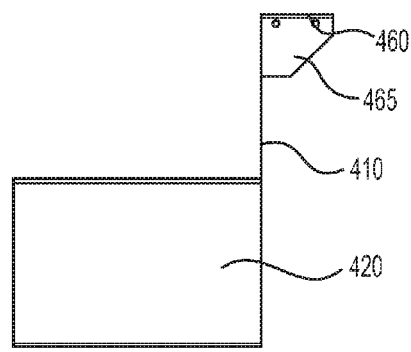
FIG. 4D is side view of a shelf for holding a cooking medium container, according to another embodiment of the invention.

FIG. 4A depicts a perspective view of a shelf 400 for holding a cooking medium container (e.g., cooking media vessel 150), according to another embodiment of the invention. Shelf 400 may include a bottom wall 440, a rear wall 410, two side walls 420 and 430, a side edge 425, a top edge 460, and a top-side edge 465. An opening 470 may be formed in top edge 460 and opening 470 may be configured to accommodate three-way valve 160. Side walls 420 and 430 may be substantially parallel to each other and may be substantially perpendicular to bottom wall 440 and rear wall 410. FIG. 4B depicts a top view of shelf 400 and FIG. 4C depicts a front view of shelf 400. As depicted in FIG. 4C, side edge 425 may be substantially perpendicular to side wall 420. As depicted in FIG. 4D, which depicts a side view of shelf 400, top edge 460 may be substantially perpendicular to rear wall 410 and to top-side edge 465.

Figure 5A:
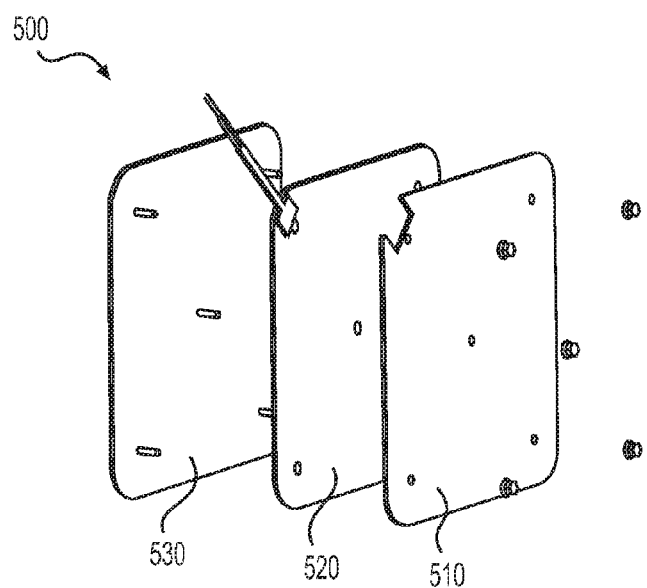
FIG. 5A is an exploded view of a heater assembly, according to an embodiment of the invention.

FIG. 5A depicts an exploded view of a heater assembly 500, according to an embodiment of the invention. Heater assembly 500 may include a first heater plate 510, a heater 520 (e.g., a silicone heater), and a second heater plate 530. Second heater plate 530 may have a plurality of studs mounted thereon or integral to second heater plate 530. Heater 520 and first heater plate 510 may each have a plurality of holes formed therein that correspond to the plurality of studs. When assembled, the studs may be disposed to go through the corresponding holes formed in heater 520 and heater plate 510, with a plurality of locknuts 540 or the like fastened to encircle the studs and secure heater assembly 500, as depicted in FIG. 5C, which depicts a side view of heater assembly 500.

Figure 5B:
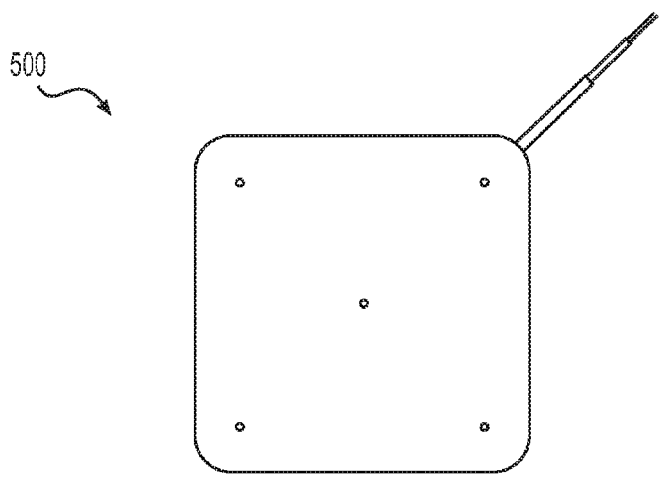
FIG. 5B is a rear view of a heater assembly, according to an embodiment of the invention.
Figure 5C:
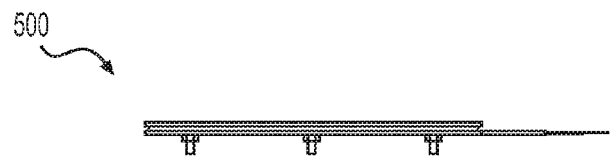
FIG. 5C is a side view of a heater assembly, according to an embodiment of the invention.

FIG. 5B depicts a rear view of heater assembly 500. Heater assembly 500 may be mounted to bottom wall 340 and to rear wall 310 of shelf 300. When in use, cooking medium vessel 150 may be disposed directly on second heater plate 530 of heater assembly 500 that is mounted to bottom wall 340. In alternative embodiments, an intervening layer or layers may be disposed between cooking medium vessel 150 and second heater plate 530. With the described orientation of heater assembly 500, an air gap may be formed between bottom wall 340 of shelf 300 and first heater plate 510, such that bottom wall 340 may remain relatively cooler while heater assembly 500, including first heater plate 510 and second heater plate 530 adjacent to cooking medium vessel 150, is heated to an elevated temperature.

Figure 6A:
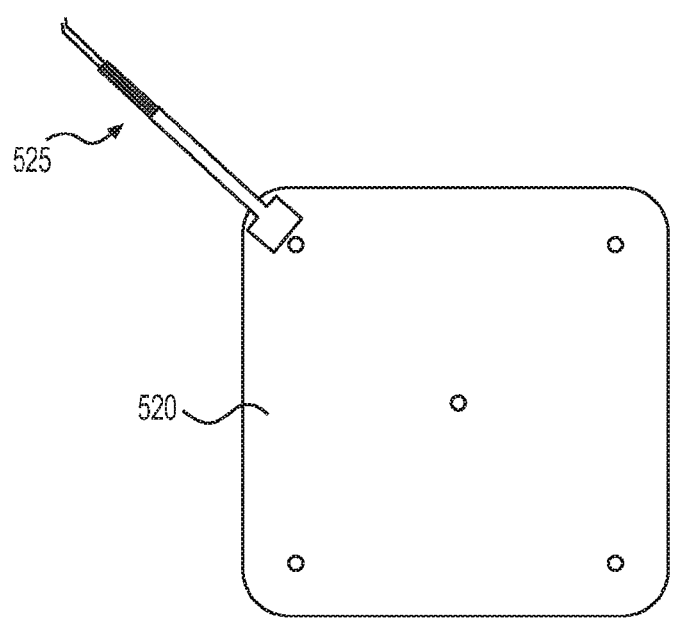
FIG. 6A is a front view of a heater, according to an embodiment of the invention.
Figure 6B:
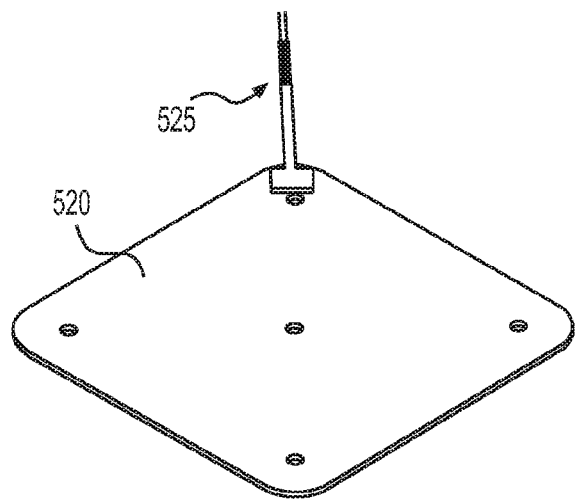
FIG. 6B is a perspective view of a heater, according to an embodiment of the invention.

FIG. 6A depicts a front view of a heater 520, according to an embodiment of the invention. Heater 520 may comprise silicone, silicone rubber, or the like, and may have wire leads 525 coupled adjacent to a corner portion of heater 520. Heater 520 may be substantially square. Heater 520 may also be alternative shapes, such as rectangular, circular, triangular, elliptical, or the like. Heater 520 also may have curved corners or pointed corners. A plurality of holes may be formed in heater 520. For example, one hole may be formed near each corner of heater 520 and another hole may be formed at substantially the center of heater 520. FIG. 6B depicts a perspective view of heater 520 with wire leads 525. Heater 520 may be, for example, a 200 watt heater.

Figure 7A:
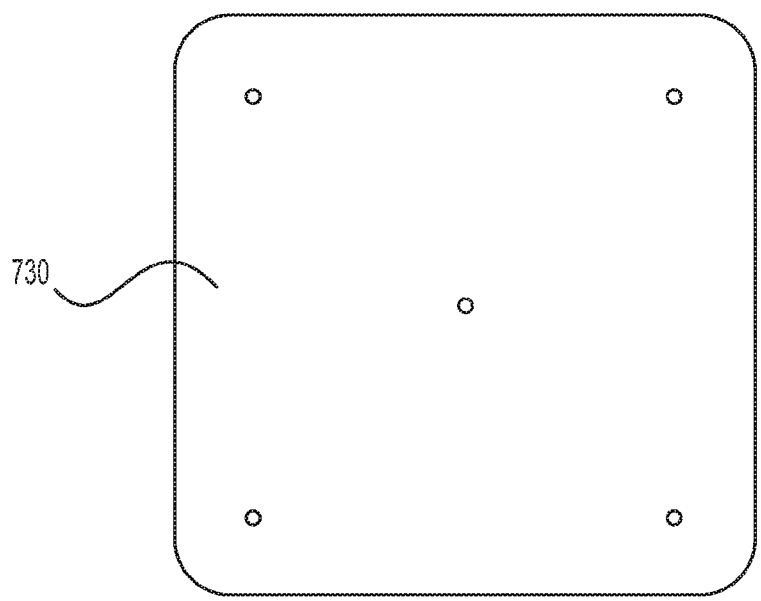
FIG. 7A is a front view of a first heater plate, according to an embodiment of the invention.
Figure 7B:
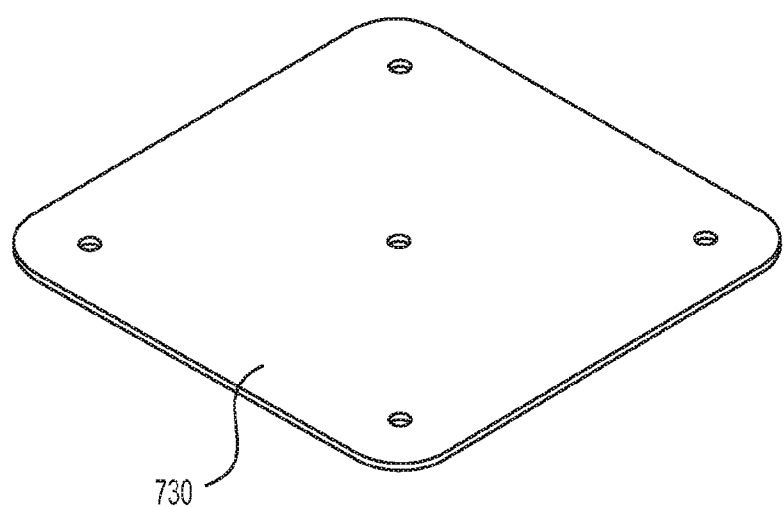
FIG. 7B is a perspective view of a first heater plate, according to an embodiment of the invention.

FIG. 7A depicts a front view of second heater plate 730, according to an embodiment of the invention. A plurality of studs may be mounted on second heater plate 730. For example, a stud may be mounted adjacent to each corner of second heater plate 730 and at substantially the center of second heater plate 730. Heater 520 may be mounted on second heater plate 730. FIG. 7B depicts a perspective view of second heater plate 730. Second heater plate 730 may be disposed on the side of heater 520 that is opposite to rear wall 310/410. Second heater plate 730 may comprise aluminum and may be shaped substantially the same shape as heater 520.

Figure 8A:
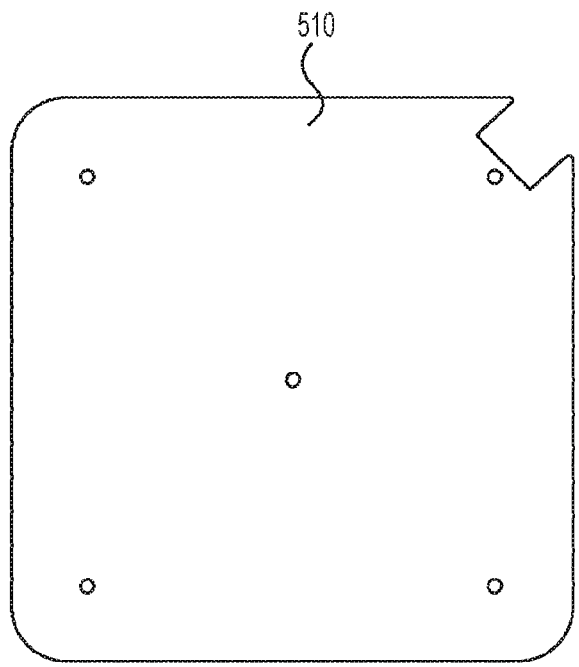
FIG. 8A is a front view of a first heater plate, according to another embodiment of the invention.
Figure 8B:
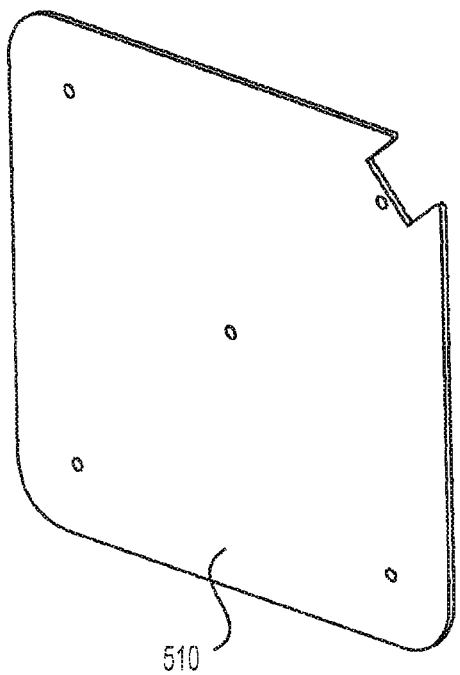
FIG. 8B is a perspective view of a first heater plate, according to another embodiment of the invention.

FIG. 8A is a front view of first heater plate 510, according to an embodiment of the invention. First heater plate 510 may have a cutout formed therein that substantially corresponds to the wire leads 525 of heater 520. A plurality of holes may be formed in first heater plate 510. For example, one hole may be formed near each corner of first heater plate 510 and another hole may be formed at substantially the center of first heater plate 510. FIG. 8B depicts a perspective view of a first heater plate 510. First heater plate 510 may be disposed on the side of heater 520 that is closest to shelf 300/400. First heater plate 510 may comprise stainless steel and may be shaped substantially the same shape as heater 520.

Figure 9A:
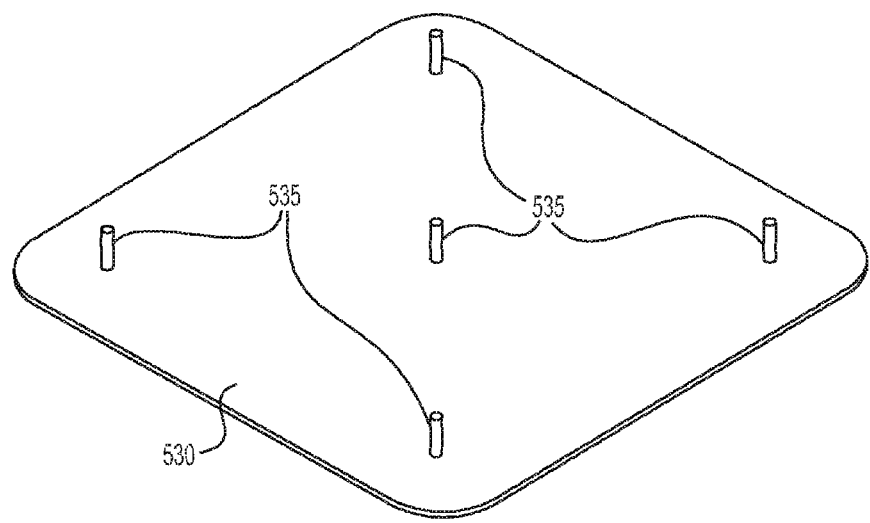
FIG. 9A is a perspective view of a second heater plate, according to an embodiment of the invention.

FIG. 9A depicts a perspective view of second heater plate 530, according to an embodiment of the invention. As depicted in FIG. 9A, a plurality of studs 535 may be pressed into the surface of second heater plate 530. Alternatively, studs 535 may be formed integrally with second heater plate 530. The studs 535 may be disposed in a variety of formations. For example, one stud may be disposed near each corner of second heater plate 530 and another stud may be disposed at substantially the center of second heater plate 530.

Figure 9B:
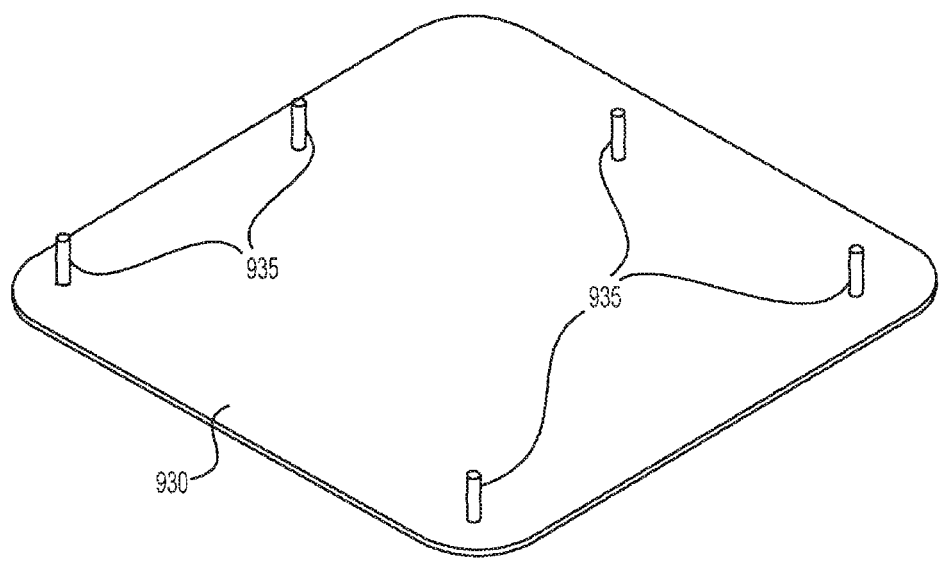
FIG. 9B is a perspective view of a second heater plate, according to another embodiment of the invention.

FIG. 9B depicts a perspective view of a second heater plate 930, according to another embodiment of the invention. Second heater plate 930 may have a plurality of studs 935 coupled to second heater plate 930. Alternatively, studs 935 may be formed integrally with second heater plate 930. The studs 935 may be disposed in a predetermined pattern or arrangement on second heater plate 930.

Figure 10B:
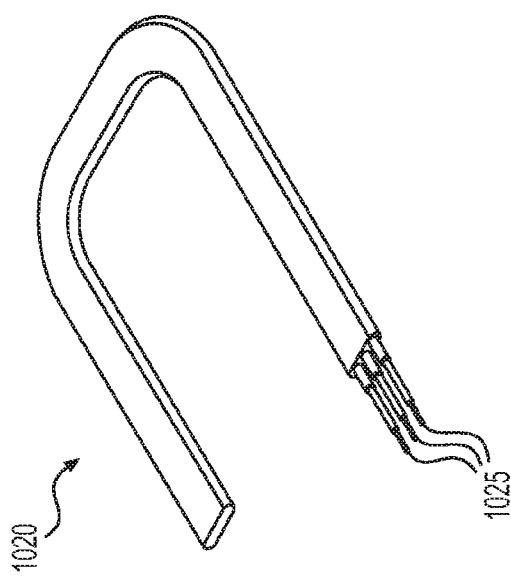
FIG. 10B is a perspective view of a heater bar, according to a further embodiment of the invention.
Figure 10A:
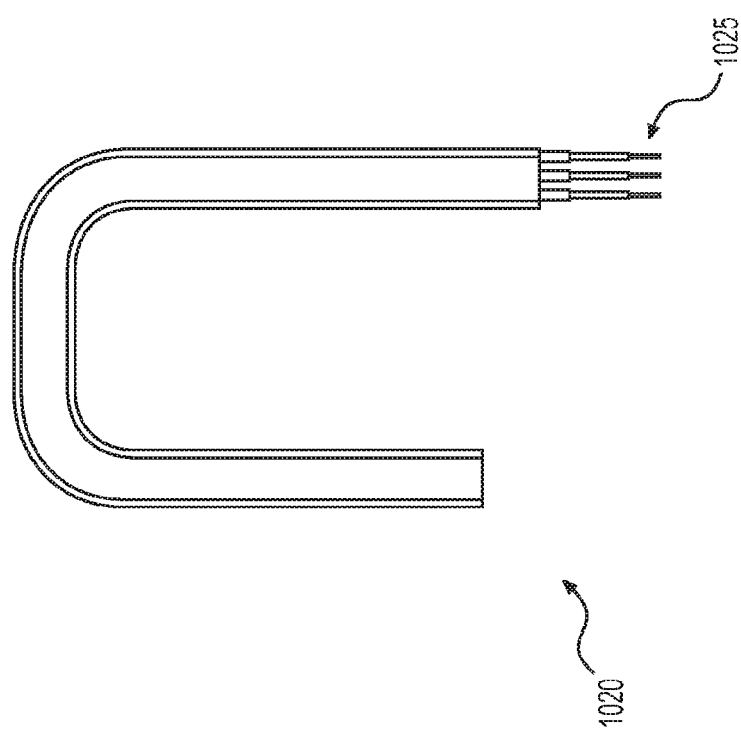
FIG. 10A is a top view of a heater bar, according to a further embodiment of the invention.

FIG. 10A depicts a top view of a heater bar 1020, according to a further embodiment of the invention. Heater bar 1020 may have wire leads 1025 disposed at one end thereof. Heater bar 1020 may be disposed on bottom wall 340/440 of shelf 300/400 to heat cooking medium vessel 150. A plurality of heater bars 1020 may be disposed on bottom wall 340/440 of shelf 300/400. The plurality of heater bars 1020 may be nested together on bottom wall 340/440. Heater bar 1020 may be curved in a U-shape. In alternative embodiments, heater bar 1020 may be curved in an L-shape, may be substantially straight, or may be curved or bent in a different shape. FIG. 10B depicts a perspective view of heater bar 1020 having wire leads 1025.

Figure 11:
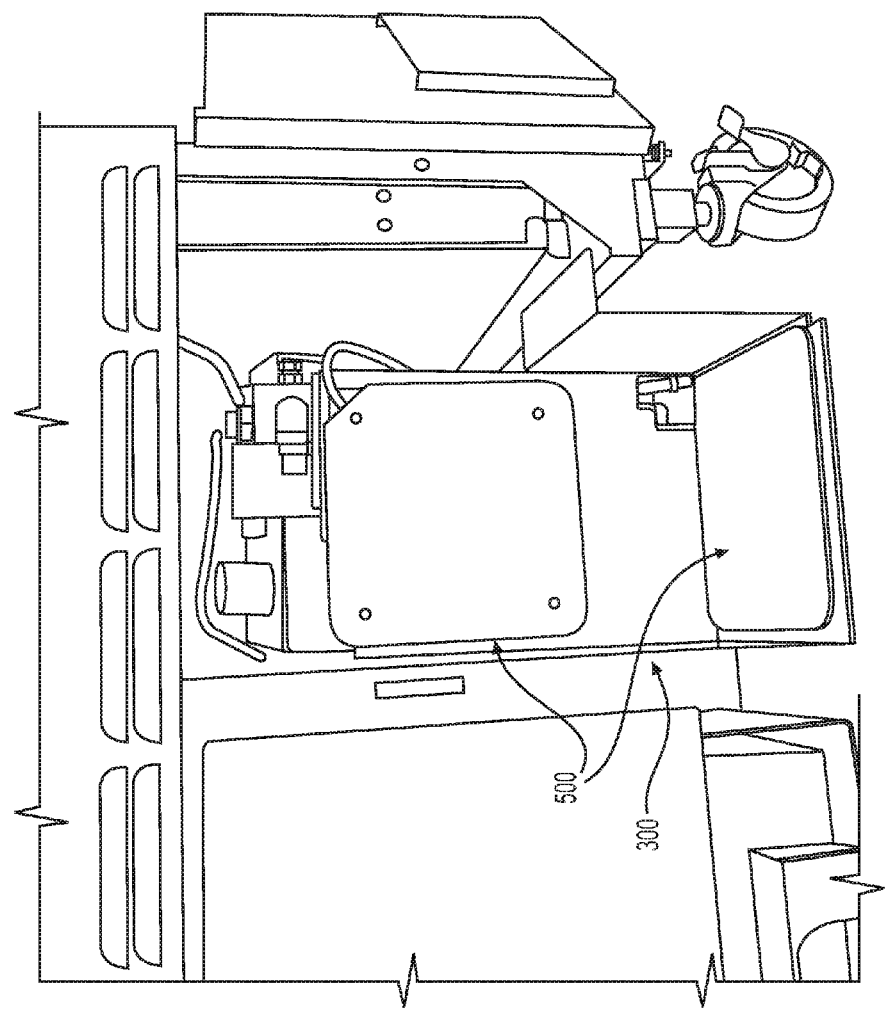
FIG. 11 is a front view of a shelf having a heater system within a cooking apparatus, according to an embodiment of the invention.

FIG. 11 depicts a front view of shelf 300 having a heater system within a cooking apparatus, according to an embodiment of the invention. For example, a heater assembly 500 may be mounted to rear wall 310 and another heater assembly 500 may be mounted to bottom wall 340. Accordingly, the heater system may supply heat to cooking medium vessel 150 from both the side and the bottom. Side edge 325 may be used to mount shelf 300 to the cooking apparatus.

In operation, each heater assembly 500 may be turned on at all times that the cooking apparatus is plugged into a power source or receives power from an alternative means. Alternatively, each heater assembly 500 may be turned on only when the cooking apparatus is turned on or when a switch disposed on the cooking apparatus or a control panel of the cooking apparatus is turned on. Accordingly, cooking medium vessel 150 may be heated, thereby warming cooking media with cooking medium vessel 150, in conjunction with or simultaneously with the cooking apparatus starting and raising the temperature of cooking media to a cooking temperature. Therefore, cooking media within cooking medium vessel 150 may be warmed so that it can be more easily distributed to one or more of cooking chambers 110-116.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the following claims.

What is claimed is:

1. A cooking apparatus, comprising:
   a supply reservoir configured to supply cooking media;
   a fluid motive device in fluid communication with the supply reservoir;
   an enclosed cooking medium line disposed between the supply reservoir and the fluid motive device;
   a three-way valve coupled to the enclosed cooking medium line and configured to introduce ambient air into the enclosed cooking medium line;
   a cooking medium receiving system configured to receive cooking media;
   a shelf configured to hold the supply reservoir therein, the shelf comprising a bottom wall and a side wall; and
   a first heater adjacent to the bottom wall of the shelf and a second heater adjacent to the side wall of the shelf,
   wherein the first heater and the second heater are configured to warm cooking media stored in the supply reservoir,
   wherein the cooking medium receiving system comprises a plurality of cooking chambers in fluid communication with the supply reservoir via the fluid motive device and the enclosed cooking medium line,
   wherein each of the plurality of cooking chambers comprises a sensor configured to determine an amount of cooking media in each of the respective plurality of cooking chambers, and
   wherein the fluid motive device and the three-way valve are configured to alternately force cooking medium to the plurality of cooking chambers for a first predetermined amount of time and then introduce air through the enclosed cooking medium line for a second predetermined amount of time in response to the sensor determining that the amount of cooking media is less than a predetermined amount.

2. The cooking apparatus of claim 1, wherein the shelf comprises an opening formed in a top portion of the shelf, the opening being configured to accommodate at least a portion of the three-way valve.

3. The cooking apparatus of claim 1, wherein the three-way valve is configured to selectively introduce ambient air through the enclosed cooking medium line to purge cooking media from the enclosed cooking medium line.

4. The cooking apparatus of claim 3, wherein the fluid motive device is configured to force cooking media to the cooking medium receiving system for a first predetermined amount of time, and the three-way valve is configured to selectively introduce ambient air through the enclosed cooking medium line for a second predetermined amount of time.

5. The cooking apparatus of claim 1, wherein a gap is formed between the shelf and the first heater.

6. The cooking apparatus of claim 1, wherein the supply reservoir is adjacent to the first heater and the second heater in an installed position.

7. The cooking apparatus of claim 1, wherein each of the first heater and the second heater comprises a heater plate and a heating mechanism coupled to the heater plate.

8. The cooking apparatus of claim 1, wherein each of the first heater and the second heater comprises a heater bar.

9. The cooking apparatus of claim 1, wherein each of the first heater and the second heater are activated when power is supplied to the cooking apparatus.

10. A method of maintaining a cooking apparatus, comprising:
    heating cooking media stored in a cooking medium reservoir that is held on a shelf with a heater adjacent to a wall of the shelf, wherein the shelf comprises a bottom wall and a side wall, and the heater comprises a first heater adjacent to the bottom wall of the shelf and a second heater adjacent to the side wall of the shelf;
    conveying cooking medium from the cooking medium reservoir to a cooking chamber via a fluid motive device for a first predetermined amount of time; and
    introducing ambient air through an enclosed cooking medium line disposed between the cooking medium reservoir and the cooking chamber for a second predetermined amount of time subsequent to the first predetermined amount of time,
    wherein the ambient air is selectively introduced through the enclosed cooking medium line via a three-way valve coupled to the enclosed cooking medium line to purge cooking media from the enclosed cooking medium line,
    wherein the method further comprises determining an amount of cooking medium in the cooking chamber with a sensor in the cooking chamber, wherein the conveying of cooking medium and the introducing of ambient air occur alternately until the sensor determines that the amount of cooking medium is greater than or equal to a predetermined amount.

11. The method of claim 10, further comprising:
activating the first and second heaters when power is supplied to the cooking apparatus.

12. The method of claim 10, further comprising:
activating the first and second heaters in response to a switch being turned on.

* * * * *